Patented Apr. 15, 1941

2,238,662

UNITED STATES PATENT OFFICE 2,238,662

RECOVERY OF FLUORSPAR FROM ORES THEREOF

Nathaniel L. Shepard, East St. Louis, Ill., assignor to Aluminum Company of America, Pittsburgh, Pa., a corporation of Pennsylvania No Drawing. Application April 19, 1939,
Serial No. 268,784

5 Claims. (Cl. 209—166)

The methods of froth-flotation to which this invention relates are designed for use in the recovery of fluorspar values from materials, ores, or concentrates containing that mineral. While the methods described herein find particular usefulness and advantage where the material to be treated is high in slime, or in calcite, or both, such methods have useful application wherever fluorspar is recovered by flotation.

The minerals commonly found associated with fluorspar in mineable veins are quartz and calcite, and one or the other, depending upon the location of the fluorspar deposit, is usually the chief constituent of the gangue of the fluorspar ore. In the United States a predominant number of the mineable veins of fluorspar occur in limestone formation and in most cases run in a direction approximately vertical to the ground surface. In these veins the ore found near the surface chiefly contains silica as the gangue but as the vein strikes downwardly the quartz is replaced to a large extent by calcite and at a considerable depth the calcite content of the gangue becomes abnormally high. Such ores may therefore contain, depending upon their location in the vein, from a relatively insignificant amount up to as much as 35 per cent or more of calcite. The term "calcite" as used in the present description and in the appended claims includes not only the substantially pure calcium carbonate found naturally associated with fluorspar but also other minerals in which calcium carbonate is the predominating constituent.

Fluorspar has a wide and varied application in the chemical, ceramic and metallurgical industries as well as in others. The mineral serves various purposes, ranging from a source of fluorine in chemical processes to a fluxing material in the manufacture of steel, and consequently it is furnished to meet a number of varying specifications as to analysis. The highest grade of fluorspar material on the market is commercially known as "acid grade" spar and is furnished to meet a requirement of 98 per cent or more of calcium fluoride. This content of calcium fluoride or even a somewhat lower content is not found in much of the ore as mined and therefore suitable methods of concentrating the lower grade ores to a product containing 90 per cent or more of calcium fluoride are of considerable importance.

The problem of floating an "acid grade" spar from material high in calcite was commercially solved by the process described by Williams and Greeman in their United States Patent 1,785,992. That process, however, involves the initial removal from the material to be floated of a substantial proportion of the slimes and other fine or colloidal-sized material. These slimes or fine-sized material contain fluorspar values, and their removal necessarily decreases the overall recovery of the fluorspar values from the ore. So while the said Williams and Greeman process floats good grades of acid spar, the total recovery obtained in the operation of the process often does not exceed 70 to 75 per cent of the original calcium fluoride content of the ore.

It is the general object of this invention to float fluorspar values from materials bearing the same by methods which do not include the removal from the process, prior to the flotation operation, of substantial quantities of the material initially introduced into the process. It is a further object of this invention to achieve this general result when treating spar-bearing material containing substantial amount of calcite. These and other objects will herein more fully appear.

The invention contemplates the reduction of the fluorspar-bearing material to proper size for flotation (if the material is not already of such size), the delivery of the material, without desliming or substantial removal of slimes, to a froth-flotation operation, an initial frothing operation at a relatively low hydrogen ion concentration to float the fluorspar values, and a succeeding frothing operation performed at a higher hydrogen ion concentration on the concentrate resulting from the initial operation, thus to finally float and separate the fluorspar values from any calcite which may have been floated in the initial operation. The presence of substantial amounts of sulphides or other metal values in the original ore or material may necessitate the introduction of preliminary and well-known steps for their elimination.

As the invention is usually practiced, the fluorspar-bearing material, if not already sized, is ground or otherwise reduced by conventional methods to pass a 65-mesh screen. The screen undersize is pulped with water and placed in a mixing cell or similar device. If the material contains large amounts of metallic sulphides, these are then removed by preliminary frothing operations such as are well-known in this art. In any event, either the originally pulped material or the pulp from which the sulphides have been removed is mixed with suitable quantities of a collector, preferably one containing a fatty acid radical, such as, for instance, oleic acid or sodium oleate. If the mixture does not have a pH in the range of about 9 to 10.5, such condition is fulfilled by adjusting the pH, usually by the addition of an alkaline substance, to that range, and preferably to a range of about 9.6 to 10.3. Since the operations about to be described are highly efficient at temperatures above about 25 to 30° C., preferably between 30 to 50° C., live steam is fed into the mixture to establish such temperatures. A depressor for calcite, such as tannic acid or some crude tannin concentrate, such as cutch, quebracho, or the like, may also be added in suitable amount if desired. A clay disperser, such as sodium silicate, may also be found to be a desirable component of the mixture, but, as the invention has been practiced, such is not necessary because, as I have discovered, the maintenance of the pH of the mixture in the range just mentioned has substantially the same effect in depressing or otherwise dispersing the slimy clay gangue.

The mixture thus formed is thoroughly agitated to insure substantial homogeneity and transferred to a rougher cell, or series of cells, where it is aerated and agitated, preferably at the temperatures above described. The froth resulting from this operation collects at least a substantial proportion of the fluorspar values, and also collects and lifts a relatively high quantity of the calcite present in the material. The silicious portion of the ore, some of the calcite, a small and unimportant part of the fluorspar, and perhaps other values, is contained in the effluent or tailing which is separated from the froth and sent to waste, or to further recovery operations if it is desirable to collect other values. The fluorspar-bearing froth is collected and sent to the next step of the operation.

In the next step the collected froth is repulped with water and placed in a cleaner cell, or series of cells, for a further aerating operation. It is the purpose of this and succeeding cleaner operations to separate the fluorspar values collected in the original froth from the unwanted calcite impurities which were also raised in that froth. This, in accordance with the invention, is accomplished by acidifying the pulp prior to aeration. Usually the acidity of the pulp need be but slight, a pH value of 6.4 to 7 being desirable. For this acidifying operation I prefer to use the mineral acids, but other acids may be used. Care should be used, of course, to select acids which contain no ion detrimental to the froth or its selectivity. The acid reacts in the pulp with the calcium carbonate and eventually, before the frothing operation is complete, the pulp may have become slightly alkaline. If desired, the pulp may be maintained in an acid condition throughout this entire operation, but this is not necessary and would entail the use of larger amounts of acid.

The froth from the first operation thus repulped and acidified is again aerated and agitated, with the result that the calcite values no longer float and drop into the effluent or tailings which are sent to waste. The resulting froth from this cleaner operation contains mainly fluorspar; but to insure the sharpest separation it is desirable to repeat the cleaner operation a number of times, in each case collecting the froth from the preceding cleaning operation, repulping and acidifying in each instance as above described.

As the result of the practice of this invention, it is found unnecessary to remove slimes or finely-sized material prior to the flotation operation, with the result that often 90 per cent, and sometimes as much as 95 per cent, of the calcium fluoride originally present in the ore is recovered in the final concentrate. This final concentrate is an acid grade spar usually having a content of calcium fluoride of 95 to 99 per cent with small amounts of calcium carbonate and some silica being present.

*Example*

A flotation feed was ground to minus 65 mesh containing about 76.77 per cent of calcium fluoride, 19.08 per cent of calcium carbonate, 3.59 per cent of $SiO_2$, the balance being undetermined. The feed was pulped and placed in a mixing cell, where it was mixed and agitated with 0.3 pound per ton of tannic acid and 0.5 pound per ton of a collector, oleic acid. About 2.5 pounds per ton of sodium carbonate were added in order to produce a pulp alkalinity of pH 9.7–10.2. After thorough mixing, the pulp was then transferred to a fluoride rougher consisting of six flotation cells where its temperature was adjusted to 38° C. by the introduction of live steam. The pulp was aerated and agitated. While it would not have been desirable in this operation to allow the temperature to drop much below 30° C., the operation might have been conducted at higher temperatures. But in this and similar runs it was found that about 38° C. was perfectly satisfactory, and the temperature was not raised higher in the interests of saving live steam. Thus it is generally not preferred to exceed about 50° C., since the cost of steam adds to the eventual cost of the process. For the same economical reasons, it is desirable to not adjust the pH for this operation much higher than about 10.5 because of the cost of the alkali necessarily added for this purpose. The froth obtained in the fluoride rougher was scraped into a launder from each of the cells while the pulp passed through the cells, and finally the tailing from the sixth cell was allowed to overflow to waste, this tailing consisting primarily of the silicious portion of the ore, together with minor amounts of calcite and fluorspar and water containing substantially all dissolved reagents. From the launder, the froth, consisting of calcium fluoride and calcium carbonate with a small quantity of the original pulp, was transported by sprays of water to the first fluoride cleaner. Sufficient hydrochloric acid was added to cause the pH of the pulp to fall to approximately 6.6. The pulp was then aerated and agitated in the five cells which composed the first fluoride cleaner. The froth from each cell was collected and the effluent from the last, or fifth, cell overflowed to waste. Due to the reaction of the acid with calciferous substances in the pulp, this effluent had a pH of 7.7. This cleaning operation was then repeated in a second fluoride cleaner and in a third fluoride cleaner, in each case the froth from the previous cleaner being repulped and its pH again adjusted to about 6.6. The effluent which was sent to waste from the second cleaner had a pH of 7.6 and the effluent which was sent from the third cleaner had a pH of 7.7. The final concentrate contained 90 per cent of all of the calcium fluoride originally fed to the mill. This concentrate had the following analysis:

|  | Per cent |
|---|---|
| $CaF_2$ | 98.46 |
| $CaCO_3$ | 1.26 |
| $SiO_2$ | 0.24 |
| Undetermined | 0.04 |

The water which was used in the above example had been treated with approximately 0.3 grain per gallon of potassium permanganate and approximately 0.3 grain per gallon of cresylic acid, in accordance with the procedures outlined in United States Patent 1,926,045 to Greeman and Lilly. While such treatment is not always necessary and will depend upon the water being used, it has been found that, generally speaking, the use of water so treated raises the total efficiency of the process, and while the treatment of the water constitutes no part of this invention, it is usually found to be a desirable step.

It is to be understood that the above examples are given merely by way of illustration and that in its broader aspects the invention is not limited to the specific details described, but is defined by the appended claims.

I claim:

1. In the process of floating fluorspar values from fluorspar ore, the steps comprising creating a fluorspar-lifting froth from a pulp containing a collector including a fatty acid radical, said pulp having a pH greater than about 9, collecting and repulping said froth, acidifying said pulp to give a pH less than about 7, and creating therefrom another fluorspar-lifting froth which is substantially free from calcite.

2. In the process of floating fluorspar values from fluorspar ore, the steps comprising collecting an initial froth containing fluorspar values and impurities including calcite from an alkaline pulp including a collector having a fatty acid radical, repulping said froth, acidifying said pulp to give a pH less than about 7, and aerating the same to create a fluorspar-lifting froth free from said impurities.

3. In the process of floating fluorspar values from fluorspar ore, the steps comprising collecting an initial froth containing fluorspar values and calcite from an alkaline pulp including a collector having a fatty acid radical, repulping said froth, acidifying said pulp to give a pH less than about 7, and aerating the same to create a fluorspar-lifting froth free from calcite.

4. In the process of floating fluorspar values from fluorspar ore, the steps comprising creating a fluorspar-lifting froth from a pulp containing a collector comprising oleic acid, said pulp having a pH greater than about 9, collecting and repulping said froth, acidifying said pulp to give a pH less than about 7, and creating therefrom another fluorspar-lifting froth which is substantially free from calcite.

5. In the process of floating fluorspar values from fluorspar ore, the steps comprising creating a fluorspar-lifting froth from a pulp containing a collector comprising sodium oleate, said pulp having a pH greater than about 9, collecting and repulping said froth, acidifying said pulp to give a pH less than about 7, and creating therefrom another fluorspar-lifting froth which is substantially free from calcite.

NATHANIEL L. SHEPARD.